United States Patent
Schmitt et al.

(10) Patent No.: US 11,732,762 B2
(45) Date of Patent: Aug. 22, 2023

(54) CLUTCH ARRANGEMENT, AND DRIVE TRAIN UNIT

(71) Applicant: ZF Friedrichshafen AG, Friedrichshafen (DE)

(72) Inventors: Guido Schmitt, Oerlenbach (DE); Alexander Bartha, Wurzburg (DE); Wolfgang Kundermann, Dornburg-Dorndorf (DE); Axel Rohm, Schonungen (DE); Gerald Viernekes, Hassfurt (DE); Alessio Paone, Werneck (DE); Monika Rössner, Donnersdorf (DE); Michael Kunth, Mellrichstadt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 608 days.

(21) Appl. No.: 16/617,407

(22) PCT Filed: May 8, 2018

(86) PCT No.: PCT/EP2018/061748
§ 371 (c)(1),
(2) Date: Nov. 26, 2019

(87) PCT Pub. No.: WO2018/219595
PCT Pub. Date: Dec. 6, 2018

(65) Prior Publication Data
US 2021/0123483 A1    Apr. 29, 2021

(30) Foreign Application Priority Data
Jun. 2, 2017   (DE) .................... 10 2017 209 398.6

(51) Int. Cl.
*F16D 11/14*      (2006.01)
*F16D 21/00*      (2006.01)
(Continued)

(52) U.S. Cl.
CPC ............... *F16D 21/00* (2013.01); *F03G 3/08* (2013.01); *F16D 11/14* (2013.01); *F16D 13/22* (2013.01);
(Continued)

(58) Field of Classification Search
CPC .......... F16D 21/00; F16D 13/38; F16D 13/46; F16D 11/14; F16D 2011/004
See application file for complete search history.

(56) References Cited

U.S. PATENT DOCUMENTS 2,738,864 A * 3/1956 Becker .................... F16D 25/12
                                                192/70.14
3,245,508 A * 4/1966 Livezey .................. F16D 13/69
                                                192/209
(Continued)

FOREIGN PATENT DOCUMENTS

DE    102009045562 A1 * 4/2011    ............. F16D 23/04
DE    10 2015 211436    1/2016
(Continued)

OTHER PUBLICATIONS

Machine translation of DE102009045562, retrieved from www.espacenet.com (Year: 2023).*

Primary Examiner — Stacey A Fluhart
(74) Attorney, Agent, or Firm — Cozen O'Connor

(57) ABSTRACT

A clutch arrangement (3) with a friction clutch (8) and a dog clutch (9), wherein the output side of the friction clutch (8) and the output side of the dog clutch (9) are connectible to a flywheel mass device (4). A powertrain unit having such clutch arrangement is also described.

24 Claims, 4 Drawing Sheets

(51) Int. Cl.
*F03G 3/08* (2006.01)
*F16D 13/22* (2006.01)
*B60K 6/30* (2007.10)
*B60K 6/387* (2007.10)
*F02N 11/04* (2006.01)

(52) U.S. Cl.
CPC ............... *B60K 6/30* (2013.01); *B60K 6/387* (2013.01); *B60Y 2200/92* (2013.01); *B60Y 2300/50* (2013.01); *F02N 11/04* (2013.01)

(56) References Cited

U.S. PATENT DOCUMENTS

| | | | | |
|---|---|---|---|---|
| 3,584,720 | A * | 6/1971 | Bark | F16D 13/52 |
| | | | | 188/72.3 |
| 3,935,934 | A * | 2/1976 | Norberg | F16D 23/02 |
| | | | | 192/69.91 |
| 5,048,654 | A * | 9/1991 | Yesnik | F16D 65/125 |
| | | | | 192/70.14 |
| 10,889,177 | B2 * | 1/2021 | Hoess | B60K 6/547 |
| 2011/0155530 | A1 * | 6/2011 | Vierk | F16D 13/38 |
| | | | | 192/48.5 |
| 2013/0166124 | A1 * | 6/2013 | Futamura | B60W 10/115 |
| | | | | 903/902 |
| 2016/0017930 | A1 * | 1/2016 | Hartz | F16D 23/12 |
| | | | | 192/66.1 |
| 2016/0097430 | A1 * | 4/2016 | Imafuku | F16D 27/115 |
| | | | | 192/18 B |

FOREIGN PATENT DOCUMENTS

| | | | | |
|---|---|---|---|---|
| DE | 102014213818 A1 * | 1/2016 | ............ | B60K 6/387 |
| EP | 2 430 330 | 3/2012 | | |

* cited by examiner

CLUTCH ARRANGEMENT, AND DRIVE TRAIN UNIT

PRIORITY CLAIM

This is a U.S. national stage of application No. PCT/EP2018/061748, filed on May 8, 2018. Priority is claimed on German Application No.: 10 2017 209 398.6, filed Jun. 2, 2027, the content of which is incorporated herein by reference.

FIELD OF THE INVENTION

The invention is directed to a clutch arrangement with a friction clutch and a dog clutch.

BACKGROUND OF THE INVENTION

Clutch arrangements in which a friction clutch and a dog clutch are connected in parallel are known. The torque which cannot be transmitted by the friction clutch alone can then be transmitted via a dog clutch.

Further, in hybridized powertrains it is known to use the electric motor to start the internal combustion engine. This has the disadvantage that the electric motor must maintain a corresponding power reserve to enable changing from electric mode to hybrid mode or all-combustion engine mode. Accordingly, the electric motor must be designed to be more robust than would be necessary for all-electric motor operation.

In view of the foregoing, it is an object of the present invention to provide a clutch arrangement by which it is possible for the electric motor to make do without a power reserve or with a smaller power reserve for starting the internal combustion engine.

SUMMARY OF THE INVENTION

This object is met in that the output side of the friction clutch and the output side of the dog clutch are connectible to a flywheel mass device. Accordingly, the clutch device, as such, has only connection points and, after assembly, is connected to the flywheel mass device. The core of the invention is considered to consist in that the clutch arrangement, which can also be referred to as momentum starting clutch arrangement, is arranged upstream of the flywheel mass device. This makes it possible to stop the flywheel mass from turning because of the electric motor, which is why the flywheel mass device has high rotational energy. The internal combustion engine can be disconnected from the flywheel mass device during electric motor transmission via the momentum starting clutch. In order to start the engine, the momentum starting clutch is closed, which can result in large torque peaks. These can be absorbed by the parallel-connected friction clutch and dog clutch.

A hard engagement of the dog clutch is also prevented by the combination of a friction clutch and a positive-engagement clutch in the form of the dog clutch.

The dog clutch can advantageously have a jaw element with at least one input-side toothing and one output-side toothing. One of the toothings, preferably the input-side toothing, can be disengaged in order to achieve uncoupling.

The dog clutch can advantageously have a jaw element which can be supported on the flywheel mass device. Accordingly, the jaw element is constructed substantially hollow-cylindrically. During assembly of the clutch arrangement, the jaw element or a bearing sleeve to which the jaw element is attached or fitted can be connected to the flywheel mass device. In particular, the jaw element is axially movably supported.

The dog clutch can advantageously be formed as a radial dog clutch. Accordingly, the teeth of the toothing are arranged in radial direction.

The dog clutch preferably has a jaw element, and a radially outwardly directed projection by which the dog clutch can be actuated is arranged at the jaw element. An actuation of the dog clutch is accordingly effected by an axial displacement of the jaw element. The projection which is acted upon by an actuation device is provided for this purpose.

The jaw element can advantageously be preloaded in a preferred position by a preloading spring. A defined initial position of the dog clutch occurs as a result of the preloading spring. The preloading spring can advantageously act on the projection which is provided for actuating the dog clutch.

The friction clutch and/or the dog clutch can advantageously be formed as normally closed clutch. In the case of the dog clutch, the preloading spring then supports the jaw element in the closing direction.

The friction clutch can advantageously be formed as a dry clutch. However, in known combined clutches comprising both a friction clutch and a dog clutch, the friction clutch is formed as wet multiple-plate clutch.

While the friction clutch can also be formed as a dry multiple-plate clutch in principle, it is preferred that the friction clutch have a clutch disk. This clutch disk is advantageously arranged on the input side.

Accordingly, the momentum starting clutch arrangement has an opposite construction in contrast to conventional starting clutches. In starting clutches having only a dry friction clutch, the clutch disk is usually connected to the transmission input shaft. It is accordingly arranged on the output side of the clutch. The clutch disk can preferably be connected to the crankshaft via a hub. At least one elastic element, particularly tangential leaf springs, can advantageously be located between the hub and the clutch disk.

The friction clutch can preferably have a pressure plate which is arranged on the output side. This is provided when the clutch disk is arranged on the input side.

The clutch arrangement can advantageously have a counter pressure plate. In known starting clutches, a flywheel or dual mass flywheel is used as counter pressure plate. This is impossible in the described construction because the flywheel mass device lies on the output side of the clutch arrangement and therefore cannot be part of the clutch input.

The counter pressure plate is advantageously connected to a housing portion of the clutch arrangement so as to be fixed with respect to rotation relative to it. Further preferably, the counter pressure plate can be supported on the input side of the clutch arrangement. In particular, the counter pressure plate can be supported on the input-side hub of the clutch arrangement. To this end, a rolling element bearing is preferably located between the hub and the counter pressure plate. Accordingly, a closed clutch module is obtained which is connectible in a simple manner to the crankshaft on one side and to the flywheel mass device on the other side.

The friction clutch and the dog clutch can preferably have a common actuation device. When the clutch arrangement is used as momentum starting clutch, the friction clutch and the dog clutch are always used simultaneously. Therefore, it is advantageous to use an individual actuation device by which both clutches can then be actuated simultaneously. Accordingly, in normally closed clutches they are released jointly.

As a result of the joint actuation, control of the clutch arrangement is facilitated and, further, component parts can be saved.

In an advantageous manner, the actuation device can first actuate the friction clutch in closing direction. This makes it possible to operate the clutch arrangement in slip mode before the dog clutch is engaged. Conversely, when opening, the dog clutch is disengaged first.

The friction clutch and/or the dog clutch can advantageously have an actuation device which actuates by pressure oil. Accordingly, the actuation is hydraulic, while the clutches of the clutch arrangement are both dry clutches in a preferred configuration. The dog clutch is always a dry clutch; the friction clutch is a dry clutch in the preferred embodiment form.

In an advantageous matter, the pressure oil can be provided through a transmission pump. In this way, the actuation of the clutch arrangement can be realized without additional component parts aside from the piston, supply line and a valve.

The clutch arrangement can preferably have an actuation device with an actuation piston which actuates both the friction clutch and the dog clutch. In particular, the actuation piston can be formed annularly, and pot-shaped walls extend in radial direction radially inwardly as well as radially outwardly. Accordingly, an actuation of the friction clutch and of the dog clutch can be carried out simultaneously through movement of the ring. By different heights or adjustments of the heights of the walls of the actuation piston, it can also be determined whether or not the friction clutch and the dog clutch are actuated simultaneously or the time interval within which the clutches are actuated can be determined. As has already been described, it is advantageous when the actuation of the friction clutch commences shortly before the actuation of the dog clutch. This can be adjusted by the heights of the pot-shaped walls. Alternatively, the actuation piston can have an actuation plate extending in radial direction.

The friction clutch can preferably be configured such that it can absorb negative torques occurring in pull direction. During operation of the clutch arrangement, it is not only positive torques that occur; negative torques can also occur in pull direction when cutting back the engine output. In this regard, the friction clutch is configured such that it can cope with negative torques by itself. Possible noises of the dog clutch, i.e., rattling, are also prevented in this way. The dog clutch is then configured such that it can absorb the remaining peak torques in positive torque direction and can also still provide a safety margin. For example, the friction clutch can transmit 600 Nm. When the peak torques are around 2000 Nm in positive direction, the dog clutch is configured such that it transmits 1500 Nm. As has already been described, the 600 Nm results from the mere fact that this torque in negative pull direction must be covered.

The friction clutch can advantageously have an input-side hub to which the input toothing of the dog clutch is connectible so as to be fixed with respect to rotation relative to it. Thus the input hub of the friction clutch is also the input part of the dog clutch, which produces the parallel connection of the friction clutch and the dog clutch. A connectivity so as to be fixed with respect to relative rotation does not mean that the input toothing of the dog clutch, which is preferably arranged on the jaw element, engages in a toothing directly incorporated into the input hub of the friction clutch. In particular, a kind of toothing carrier can be fixedly connected to the input hub. The input toothing of the dog clutch can then engage in this toothing.

In particular, the input toothing of the dog clutch is disengageable. This means that the positive engagement of the toothing between the hub and input toothing of the dog clutch is canceled when uncoupling. However, the toothing on the output side of the dog clutch can preferably continuously engage with a toothing on the side of the flywheel mass device. It is also true with respect to the side of the flywheel mass device that the toothing can be incorporated integrally in the part of the flywheel mass device that contacts the dog clutch. However, it is also preferable in this case that a kind of toothing carrier is fixedly connected to the flywheel mass device and the flywheel mass device is constructed of multiple parts. This is considerably easier to produce in technical respects with regard to manufacture than a one-piece construction of the flywheel mass device.

The clutch arrangement can advantageously be formed as an assembly unit. In this case, it is a preassembled module which can be inserted into the powertrain.

The invention is directed, in addition, to a powertrain unit with a clutch arrangement and at least part of a flywheel mass device. As was already described in the introductory part, the clutch arrangement is to be employed as a momentum starting clutch in a hybridized powertrain. It is not a start-up clutch but rather a clutch for starting the internal combustion engine. Accordingly, the powertrain is characterized in that a clutch arrangement is formed in the manner described above.

Accordingly, all of the formulations respecting the clutch arrangement insofar as it concerns its function are no longer possible but are realized. For example, the output side of the friction clutch is connected to the flywheel mass device so as to be fixed with respect to rotation relative to it. The jaw element is supported on the flywheel mass device. However, this is not unequivocal with respect to the connection of the dog clutch to the flywheel mass device, since at least one side of the dog clutch remains connectible to the mating toothing because, as was described above, the dog clutch is disengaged for releasing. Accordingly, there is no continuous connection of the toothing on one side of the dog clutch but rather only a meshing in the engaged state.

The flywheel mass device can advantageously be formed as a dual mass flywheel. The output side of the friction clutch is then connected to the primary side of the dual mass flywheel. The output toothing of the dog clutch is likewise connected or connectible to the primary side of the dual mass flywheel.

Instead of a dual mass flywheel, a single mass flywheel could also be used. In this case, the coupling locations are to be provided just as with the dual mass flywheel.

The friction clutch and/or dog clutch can preferably have an actuation device which can be actuated by pressure oil, and the flywheel mass device can be formed to receive a portion of the pressure chamber. The flywheel mass device can form a portion of the wall of the pressure chamber, but it can also receive a wall element of the pressure chamber and accordingly support the latter. As has already been described with respect to the toothing, it is simpler in technical respects having to do with manufacture when the flywheel mass device is not formed in one piece. Accordingly, the flywheel mass device can also comprise a plurality of component parts.

The flywheel mass device can preferably receive a portion of the wall of the pressure chamber, and the output toothing of the dog clutch engages this component part simultaneously. This results in an extremely compact construction of the powertrain, since the pressure chamber simultaneously forms the output of the dog clutch.

A supply of pressure oil can advantageously lead through the flywheel mass device. In particular, the pressure oil supply can be the pressure oil supply of the actuation device of the friction clutch and/or of the dog clutch. When the flywheel mass device is formed as a dual mass flywheel, the pressure oil supply can lead through the primary part of the dual mass flywheel.

The powertrain can advantageously have a disconnect clutch on the output side of the flywheel mass device. This disconnect clutch serves to disconnect the electric motor from the internal combustion engine so that the drag torque of the internal combustion engine need not be overcome in electric motor operation. Further advantageously, the powertrain can have an electric motor on the output side of the flywheel mass device. The electric motor is preferably coupled to the powertrain in P2 arrangement.

BRIEF DESCRIPTION OF THE DRAWINGS

Further advantages, features and particulars of the invention will be apparent from the following description of embodiment examples and figures. The drawings show.

DETAILED DESCRIPTION OF THE PRESENTLY PREFERRED EMBODIMENTS

Figure 1:
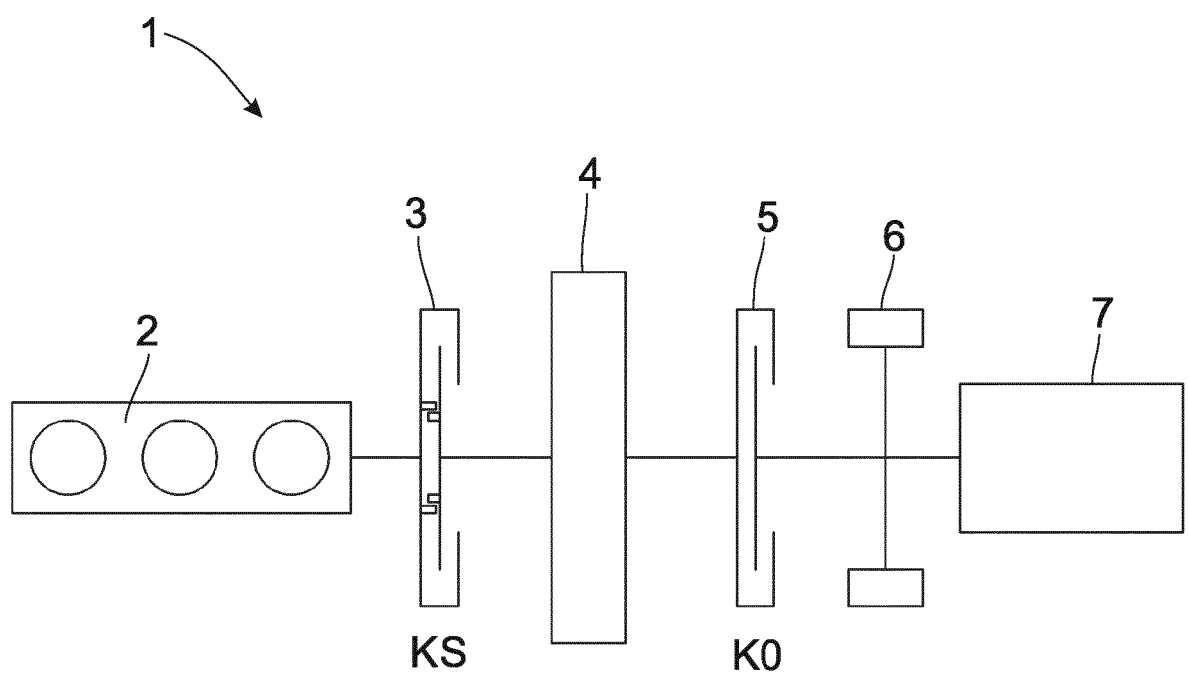
FIG. 1 a powertrain.

FIG. 1 shows a powertrain 1 with an internal combustion engine 2, a momentum starting clutch arrangement 3, a flywheel mass device 4, a disconnect clutch 5, an electric motor 6 and a transmission 7. Electric motor 6 can be configured as an individual electric motor or as electric motors connected in series. It is essential here that electric motor 6 engages powertrain 1 upstream of the transmission 7.

The momentum starting clutch arrangement 3 is distinguished by its position upstream of the flywheel mass device 4. This has to do with the particular function of the momentum starting clutch arrangement 3 which serves merely to start the internal combustion engine 2 and otherwise transmits the torque of the internal combustion engine 2. By providing the momentum starting clutch arrangement 3, it is possible to configure the electric motor 6 with lower power reserves, which facilitates production. The momentum starting clutch arrangement 3 disconnects the internal combustion engine 2 from the rest of the powertrain during all-electronic operation. Accordingly, the electric motor 6 also drives the flywheel mass device 4 as energy accumulator during all-electric motor operation. However, the added power that must be provided by the electric motor 6 for this purpose in all-electric motor operation is less than the power reserve that would be necessary if the electric motor 6 had to accelerate not only the internal combustion engine but also the flywheel mass device 4 in order to start the internal combustion engine.

Accordingly, viewed on the whole, slightly more power must be provided during operation of the electric motor 6 in order to keep the flywheel mass device 4 running. In return, however, the electric motor 6 can be designed less robustly overall because the energy stored in the flywheel mass device 4 can then be utilized for starting the internal combustion engine 2.

The momentum starting clutch arrangement 3 is notably not a start-up clutch because it is not used to set the motor vehicle in motion. Regardless of whether or not the motor vehicle is already in motion, the momentum starting clutch arrangement 3 merely serves to start the internal combustion engine 2. Therefore, in terms of design, it is configurable differently than a start-up clutch, for example, with respect to the dissipation of heat. To this extent, the different function is noticeable, for example, in the amount of pressure plate material.

Figure 2:
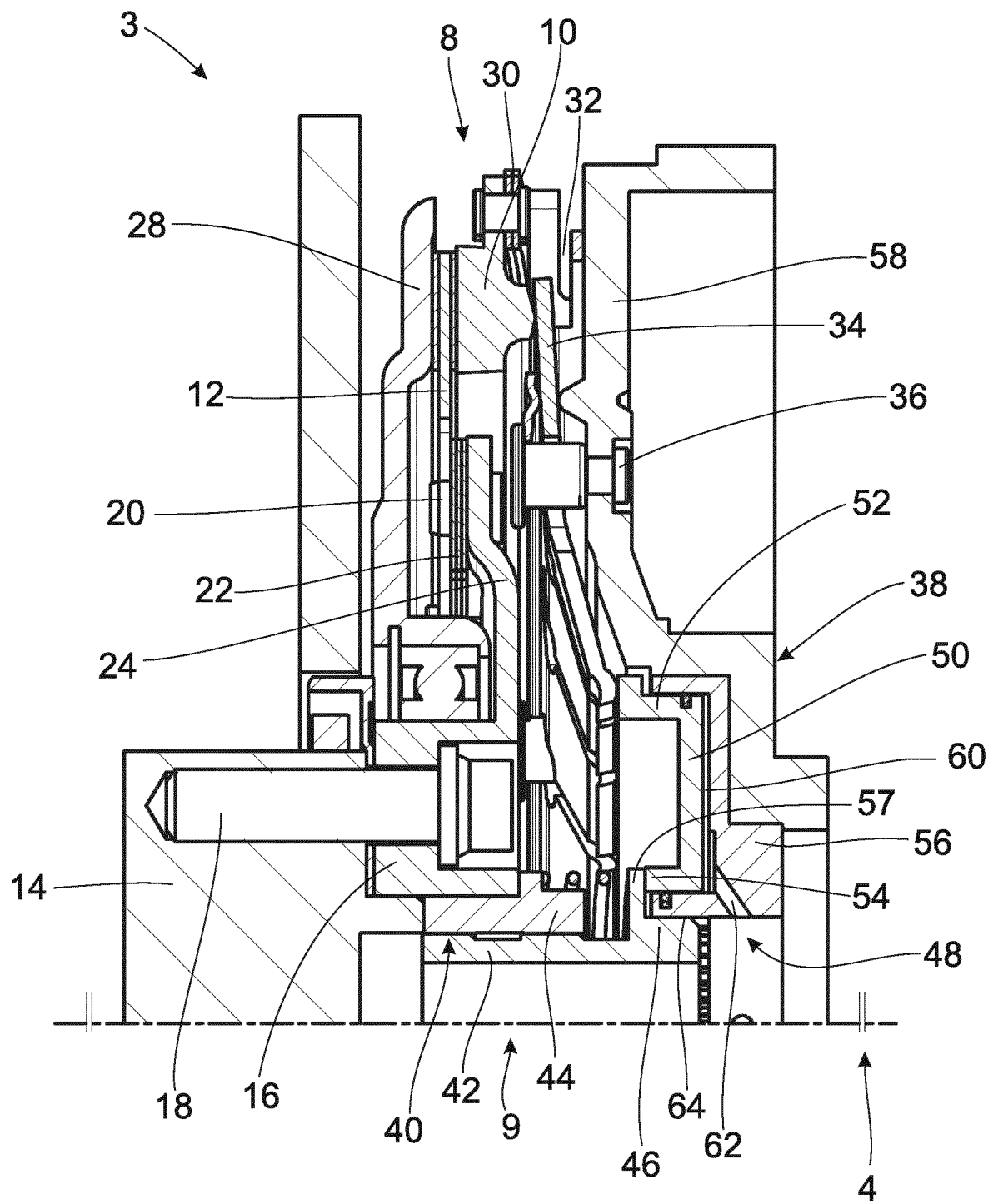
FIG. 2 a clutch arrangement in a first configuration.

FIG. 2 shows a momentum starting clutch arrangement 3 in a first configuration. Momentum starting clutch arrangement 3 has a friction clutch 8 and a dog clutch 9 arranged parallel to the latter. Friction clutch 8 is designed as a dry friction clutch. It is configured in particular as a single-disk friction clutch and accordingly comprises a pressure plate 10 and a clutch disk 12. The input side of the friction clutch 8 is connected to the crankshaft 14, specifically via the hub 16. For example, hub 16 can be screwed to crankshaft 14 by screws 18.

Clutch disk 12 is fastened to the input hub 16 by rivets 20 and via tangential leaf springs 22. Accordingly, clutch disk 12 is connected to crankshaft 14 so as to be fixed with respect to rotation relative to it. The tangential leaf springs 22 provide for an axial displaceability of the clutch disk 12, which can also be realized in a different manner. Also, hub 16 need not have a hub disk 24 at which the tangential leaf springs 22 or clutch disk 12 engage.

Pressure plate 10, counter pressure plate 28, tangential leaf springs 30, housing 32 and diaphragm spring 34 are located on the output side of friction clutch 8.

In FIG. 2, the diaphragm spring 34 is fastened to the primary side 38 of flywheel mass device 4 by rivets 36. However, this is not mandatory as will be appreciated from FIG. 4, for example. As with this type of friction clutch, the pressure plate 10 is axially displaceably supported at housing 32 via tangential leaf springs 30. Friction clutch 8 is releasable via diaphragm spring 34. Accordingly, friction clutch 8 is formed as a normally closed clutch.

Dog clutch 9 likewise connects the crankshaft 14 to the primary side 38 of the flywheel mass device 4. The input toothing 40 of dog clutch 9 which is arranged at a jaw element 42 communicates with crankshaft 14 via the input hub 16 and a driver element 44 which is arranged at the latter at least so as to be fixed with respect to rotation relative to it. As has already been described, it is simpler to arrange an additional element at hub 16 or to fasten the driver element 44 to hub 16 than to provide the toothing directly at the input hub 16. On the other hand, the output toothing 46 of the dog clutch 9 or of the jaw element 42 engages with the primary side 38 or, generally, with the flywheel mass device 4.

From this point of view, the toothing on the side of the hub 16 and on the primary side 38 is not part of the dog clutch 9. Depending on the construction of the powertrain 1 and of the momentum starting clutch arrangement 3, the latter can also be viewed as, or configured as, part of the dog clutch.

The momentum starting clutch arrangement 3 has an actuation device 48 for actuating the friction clutch 8 and the dog clutch 9. The actuation device 48 is controlled by pressure oil which axially displaces an actuation piston 50. Actuation piston 50 is formed annularly. It has a wall 52 and 54 radially inwardly and radially outwardly, respectively. Wall 52 contacts diaphragm spring 34, and wall 54 contacts a projection 57 which is arranged at the jaw element 42. Due to wall 52 being higher than wall 54 and also as a result of the arrangement of the friction clutch 8 compared to the dog clutch 9, the friction clutch 8 is actuated, i.e., engaged and disengaged, earlier than the dog clutch 9.

The pressure chamber is defined not only by the piston 50 but also by the connection element 56. Connection element 56 is part of the primary side 38 of the flywheel mass device 4. Accordingly, primary side 38 is formed of multiple parts, the base body 58 forming a kind of skeleton to which connection element 56 is fastened. Accordingly, the primary side 38 and therefore the flywheel mass device 4 also receive the pressure chamber 60. A supply line 62 to the pressure chamber 60 leads through the primary side 38.

The connection element 56 performs a dual function. On the one hand, it forms the wall of the pressure chamber 60. On the other hand, it has a toothing 64 which engages with the output toothing 46 of jaw element 42. Toothings 46 and 64 are preferably always in engagement, i.e., regardless of whether dog clutch 9 is engaged or disengaged. This is realized over the axial length of toothings 46 and 64.

Figure 3:
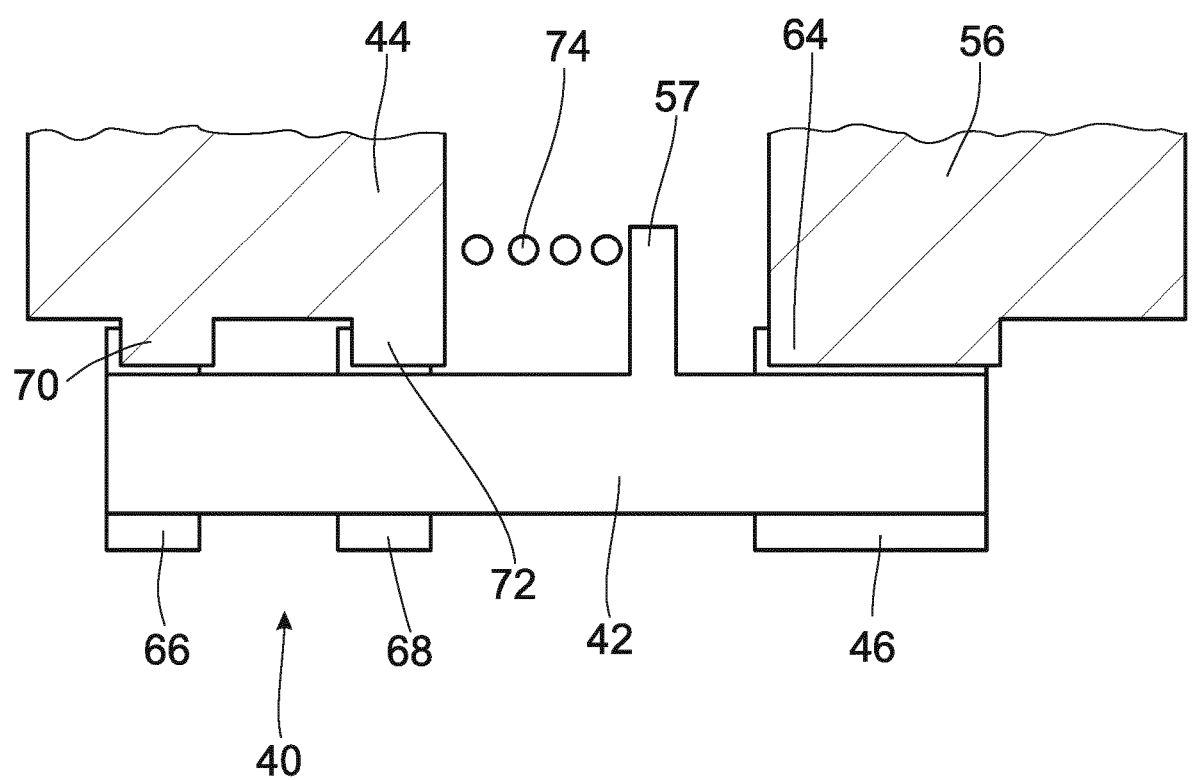
FIG. 3 a detailed view of a dog clutch.

FIG. 3 shows the jaw element 42 in detail. The input toothing 40 and the output toothing 46 can be discerned. Input toothing 40 is constructed with two toothings 66 and 68 so that during an axial movement leftward it is no longer in register with the mating toothing, and the frictional engagement is cancelled. The input toothing 40 is then disengaged. As was described above, the mating toothing is arranged at driver element 44 and comprises toothings 70 and 72.

In contrast, output toothing 46 is much longer in axial direction so that the mating toothing 64 is not disengaged even when there is an axial displacement relative to toothing 46 and accordingly remains constantly engaged.

Projection 57 and preloading spring 74 are also discerned.

Figure 4:
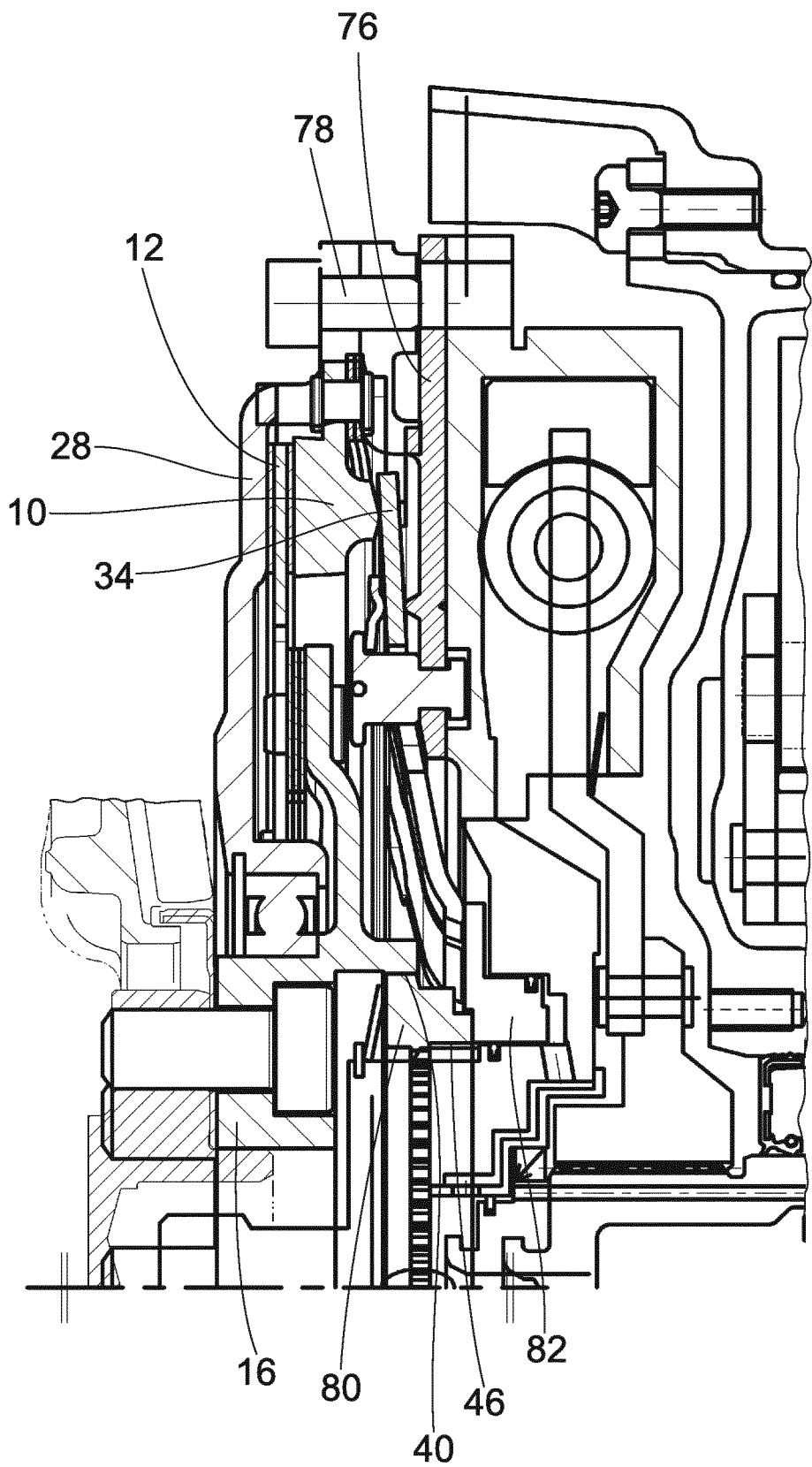
FIG. 4 a clutch arrangement in a second configuration.

FIG. 4 shows a further configuration of the momentum starting clutch arrangement 3. In contrast to the configuration according to FIG. 2, the diaphragm spring is fastened to a driver plate 76 and not to the primary side 38 of the flywheel mass device 4, so that the momentum starting clutch arrangement can be installed as a finished preassembled module. The momentum starting clutch arrangement 3 can then be tightly screwed to flywheel mass unit 4 via screws 78. It will be appreciated that only output-side elements are fastened by screws. The construction according to FIG. 4 agrees in many details with the construction according to FIG. 2 so that the same reference numerals are used.

A difference consists in the specific configuration of jaw element 80 compared to jaw element 42.

In contrast to FIG. 2, the actuation piston 82 is also no longer provided with walls; rather, it is formed more or less from a straight front side, also known as actuation plate, which can axially move both the diaphragm spring 34 and the jaw element 80. However, piston 82 is still annular.

REFERENCE NUMERALS 1 powertrain
2 internal combustion engine
3 momentum starting clutch arrangement
4 flywheel mass device
5 disconnect clutch
6 electric motor
7 transmission
8 friction clutch
9 dog clutch
10 pressure plate
12 clutch disk
14 crankshaft
16 hub
18 screws
20 rivet
22 tangential leaf spring
24 hub disk
28 counter pressure plate
30 tangential leaf spring
32 housing
34 diaphragm spring
36 rivet
38 primary side
40 input toothing
42 jaw element
44 driver element
46 output toothing
48 actuation device
50 actuation piston
52 wall
54 wall
56 connection element
57 projection
58 base body
60 pressure chamber
62 supply line
64 toothing
66 toothing
68 toothing
70 toothing
72 toothing
74 preloading spring
76 driver plate
78 screw
80 jaw element
82 actuation piston

The invention claimed is:

1. A clutch arrangement (3) comprising:
a friction clutch (8) having an output side; and
a dog clutch (9) having an output side;
the output side of the friction clutch (8) and the output side of the dog clutch (9) being connectible to a flywheel mass device (4),
wherein the dog clutch (9) comprises a jaw element (42, 80) having mounted thereon at least one input-side toothing (40) and one output-side toothing (46),
wherein the dog clutch (9) is entirely radially inside the friction clutch (8),
wherein the friction clutch (8) and/or the dog clutch (9) are formed as normally closed clutches.

2. The clutch arrangement according to claim 1, wherein the dog clutch additionally comprises the jaw element (42, 80) supportable on the flywheel mass device (4).

3. The clutch arrangement according to claim 1, wherein the dog clutch (9) is formed as radial dog clutch.

4. The clutch arrangement according to claim 1, wherein the friction clutch (8) is formed as dry clutch.

5. The clutch arrangement according to claim 1, wherein the friction clutch (8) comprises a clutch disk (12) arranged on an input side.

6. The clutch arrangement according to claim 1, wherein the friction clutch (8) comprises a pressure plate (10) arranged on an output side.

7. The clutch arrangement according to claim 1, wherein the friction clutch (8) and the dog clutch (9) have a common actuation device.

8. The clutch arrangement according to claim 7, wherein the actuation device (48) is constructed so as to first actuate the friction clutch (8) in a closing direction.

9. The clutch arrangement according to claim 1, wherein the friction clutch (8) and/or the dog clutch (9) additionally comprises an actuation device (48) actuated by pressure oil.

10. The clutch arrangement according to claim 1, wherein the clutch arrangement (3) additionally comprises an actuation device (48) with an actuation piston (50) for actuating both the friction clutch (8) and the dog clutch (9).

11. The clutch arrangement according to claim 1, wherein negative torque is generated in a pulling direction and wherein the friction clutch (9) is configured so as to absorb all of the negative torque.

12. The clutch arrangement according to claim 1, wherein the friction clutch (8) and the dog clutch (9) form an assembly unit.

13. The clutch arrangement according to claim 1, wherein the jaw element (42, 80) has mounted thereon at least two input-side toothings (40), each configured to mate with a respective toothing.

14. A clutch arrangement comprising:
a friction clutch (8) having an output side; and
a dog clutch (9) having an output side;
the output side of the friction clutch (8) and the output side of the dog clutch (9) being connectible to a flywheel mass device (4),
wherein the dog clutch (9) comprises a jaw element (42, 80) having mounted thereon at least one input-side toothing (40) and one output-side toothing (46),
wherein the dog clutch (9) is entirely radially inside the friction clutch (8),
wherein the at least one input-side toothing (40) is axially spaced apart from the one output-side toothing (46) on the jaw element (42, 80).

15. The clutch arrangement according to claim 14, wherein the friction clutch (8) comprises an input-side hub (16) to which the input toothing (40) of the jaw element of the dog clutch (9) is connected so as to be fixed with respect to rotation relative to it.

16. The clutch element according to claim 14, wherein the dog clutch jaw element is supportable on the flywheel mass device (4).

17. A powertrain unit with a clutch arrangement and at least part of a flywheel mass device (4), and wherein the clutch arrangement (3) comprises:
a friction clutch (8) having an output side and a dog clutch (9) having an output side; the output side of the friction clutch (8) and the output side of the dog clutch (9) being connectible to at least part of the flywheel mass device (4),
wherein the flywheel mass device (4) is formed as dual mass flywheel,
wherein the flywheel mass device (4) comprises a wall (56) which simultaneously forms a portion of a pressure chamber (60) and the output portion of the dog clutch (9).

18. The powertrain unit according to claim 17, wherein the friction clutch (8) and/or the dog clutch (9) comprise an actuation device (48) actuated by pressure oil, and the flywheel mass device is formed to receive a portion of a pressure chamber (60).

19. The powertrain unit according to claim 18, wherein the flywheel mass device (4) comprises a wall (56) which simultaneously forms a portion of a pressure chamber (60) and the output portion of the dog clutch (9).

20. The powertrain unit according to claim 17, wherein the flywheel mass device (4) comprises a wall (56) which simultaneously forms a portion of a pressure chamber (60) and the output portion of the dog clutch (9).

21. The powertrain unit according to claim 17, additionally comprising a pressure oil supply leading through the flywheel mass device (4).

22. The powertrain unit according to claim 17, further comprising a disconnect clutch (5) on an output side of the flywheel mass device.

23. The powertrain unit according to claim 17, further comprising an electric motor (6) on an output side of the flywheel mass device (4).

24. A powertrain unit with a clutch arrangement and at least part of a flywheel mass device (4), wherein the clutch arrangement (3) comprises:
a friction clutch (8) having an output side and a dog clutch (9) having an output side; the output side of the friction clutch (8) and the output side of the dog clutch (9) being connectible to at least part of the flywheel mass device (4),
wherein the flywheel mass device (4) is formed as dual mass flywheel, and
wherein the friction clutch (8) and/or the dog clutch (9) comprise an actuation device (48) actuated by pressure oil, and the flywheel mass device is formed to receive a portion of a pressure chamber (60).

\* \* \* \* \*